US012347369B2

(12) United States Patent
Wang et al.

(10) Patent No.: US 12,347,369 B2
(45) Date of Patent: Jul. 1, 2025

(54) METHOD FOR OPTIMIZING IMAGE QUALITY AND MODULE FOR OPTIMIZING IMAGE QUALITY

(71) Applicants: Mianyang BOE Optoelectronics Technology Co., Ltd., Sichuan (CN); BOE Technology Group Co., Ltd., Beijing (CN)

(72) Inventors: Jiayi Wang, Beijing (CN); Tsanghong Wang, Beijing (CN); Zhoujun Chen, Beijing (CN); Yurun Miao, Beijing (CN)

(73) Assignees: Mianyang BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/908,103

(22) PCT Filed: Nov. 15, 2021

(86) PCT No.: PCT/CN2021/130579

§ 371 (c)(1),
(2) Date: Aug. 30, 2022

(87) PCT Pub. No.: WO2022/156326

PCT Pub. Date: Jul. 28, 2022

(65) Prior Publication Data

US 2023/0079286 A1 Mar. 16, 2023

(30) Foreign Application Priority Data

Jan. 22, 2021 (CN) ......................... 202110087209.6

(51) Int. Cl.
*G09G 3/3225* (2016.01)

(52) U.S. Cl.
CPC ... *G09G 3/3225* (2013.01); *G09G 2320/0233* (2013.01); *G09G 2320/0673* (2013.01)

(58) Field of Classification Search
CPC ......... G09G 3/3223; G09G 2320/0233; G09G 3/3225; G09G 2320/0673;
(Continued)

(56) References Cited

U.S. PATENT DOCUMENTS

2006/0208984 A1 9/2006 Kim et al.
2006/0231838 A1 10/2006 Kim
(Continued)

FOREIGN PATENT DOCUMENTS

CN 1847964 A 10/2006
CN 107170405 A 9/2017
(Continued)

OTHER PUBLICATIONS

CN 202110087209.6 first office action.
PCT/CN2021/130579 international search report and written opinion.

*Primary Examiner* — Hong Zhou
(74) *Attorney, Agent, or Firm* — IPro, PLLC

(57) ABSTRACT

A method for optimizing image quality and a module for optimizing image quality are provided. The method includes: in a gamma adjustment phase, controlling and setting respective actual data voltages corresponding to a grey scale 0 of sub-pixels having different colors, and controlling at least two of the actual data voltages corresponding to the grey scale 0 of the sub-pixels having different colors to be different from each other, to control a gamma curve of the sub-pixels to make an absolute value of a luminance difference between the luminance of the gamma curve corresponding to each grey scale value and the luminance of a standard gamma curve corresponding to the grey scale value less than a predetermined luminance difference;
(Continued)

and in a display phase, when a grey scale value provided to sub-pixels having different colors is 0, applying the corresponding actual data voltages to the sub-pixels having different colors.

13 Claims, 4 Drawing Sheets

(58) Field of Classification Search
CPC ..... G09G 2300/0819; G09G 2310/061; G09G 3/3233; G09G 2320/0242; G09G 2320/041; G09G 2320/045; G09G 2360/145
See application file for complete search history.

(56) References Cited

U.S. PATENT DOCUMENTS

2007/0159501 A1 7/2007 Chen et al.
2015/0179103 A1 6/2015 Tani et al.
2015/0339967 A1* 11/2015 Shin .................... G09G 3/2003 345/690
2015/0379938 A1 12/2015 Choi et al.
2016/0055803 A1* 2/2016 Kim .................... G09G 3/3233 345/691
2016/0275842 A1* 9/2016 Seok .................... G09G 3/3233
2017/0076656 A1* 3/2017 Bang .................... G09G 3/2092
2017/0098407 A1* 4/2017 Jeong .................... G09G 3/3258
2018/0322827 A1* 11/2018 Zhang .................... G09G 3/3241
2019/0114954 A1 4/2019 Xuan et al.
2020/0279518 A1* 9/2020 Pyo .................... G09G 3/3233
2020/0365090 A1 11/2020 Yoon et al.
2021/0005158 A1 1/2021 Huang et al.
2022/0415251 A1 12/2022 Yang et al.

FOREIGN PATENT DOCUMENTS

CN 107564478 A 1/2018
CN 110277059 A 9/2019
CN 110473499 A 11/2019
CN 110491330 A 11/2019
CN 111415616 A 7/2020
CN 111754905 A 10/2020
CN 111816137 A 10/2020
CN 112885303 A 6/2021

* cited by examiner

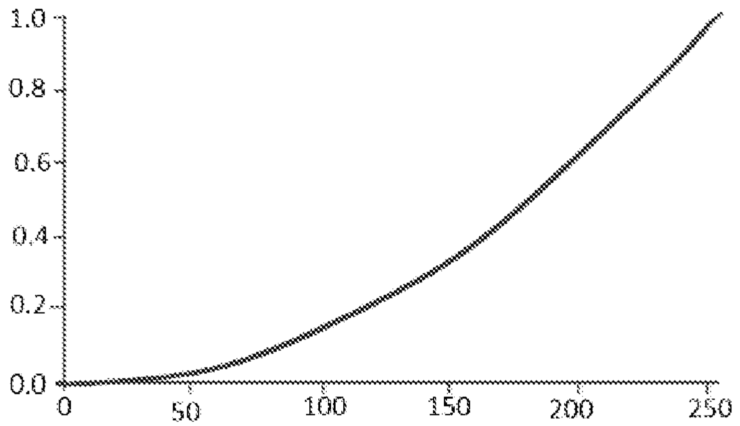
Fig. 4C
| VR0(V) | VG0(V) | VB0(V) | R01 |
|---|---|---|---|
| 6. 1 | 6. 1 | 6. 1 | 0. 35 |
| 6. 1 | 5. 9 | 5. 9 | 0. 40 |
| 6. 1 | 5. 8 | 5. 8 | 0. 47 |
| 6. 1 | 5. 4 | 5. 4 | 0. 57 |
Fig. 5
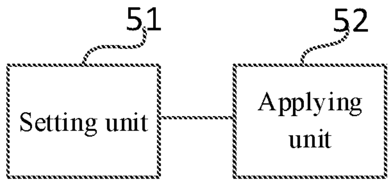
Fig. 6

METHOD FOR OPTIMIZING IMAGE QUALITY AND MODULE FOR OPTIMIZING IMAGE QUALITY

CROSS-REFERENCE TO RELATED APPLICATIONS

This application is the U.S. national phase of PCT Application PCT/CN2021/130579 filed on Nov. 15, 2021, which claims priority to Chinese Patent application Ser. No. 20/2110087209.6 filed in China on Jan. 22, 2021, the entire contents of which is hereby incorporated by reference.

TECHNICAL FIELD

The present disclosure relates to the technical field of display, and in particular, to a method for optimizing image quality and a module for optimizing image quality.

BACKGROUND

In the related art, there are problems of attenuation and uneven gray scale transition at low gray scale monochrome brightness due to parasitic capacitance and lateral leakage between sub-pixels.

SUMMARY

In an aspect, a method for optimizing image quality is provided by an embodiment of the present disclosure, the method for optimizing image quality is applied to a display panel comprising a plurality of sub-pixels and includes:

controlling and setting, in a gamma adjustment phase, actual data voltages corresponding to a grey scale 0 of respective sub-pixels having different colors, and controlling at least two of the actual data voltages corresponding to the grey scale 0 of the sub-pixels having different colors to be different from each other, to control a gamma curve of the sub-pixels to make an absolute value of a luminance difference between the luminance of the gamma curve corresponding to each grey scale value and the luminance of a standard gamma curve corresponding to the grey scale value less than a predetermined luminance difference; the predetermined luminance difference being greater than 0; and applying, in a display phase, when a grey scale value applied to sub-pixels having different colors is 0, the corresponding actual data voltages to the sub-pixels having different colors.

In one embodiment, a drive transistor in the sub-pixels is a p-type transistor; and the controlling at least two of the actual data voltages corresponding to the grey scale 0 of the sub-pixels having different colors to be different from each other, includes:

setting an actual data voltage corresponding to the grey scale 0 of green sub-pixels to be less than an actual data voltage corresponding to the grey scale 0 of red sub-pixels; and/or;

setting an actual data voltage corresponding to the grey scale 0 of blue sub-pixels to be less than the actual data voltage corresponding to the grey scale 0 of red sub-pixels.

In one embodiment, a drive transistor in the sub-pixels is an n-type transistor; and the controlling at least two of the actual data voltages corresponding to the grey scale 0 of the sub-pixels having different colors to be different from each other, includes:

setting the actual data voltage corresponding to the grey scale 0 of the green sub-pixels to be greater than the actual data voltage corresponding to the grey scale 0 of the red sub-pixels; and/or;

setting the actual data voltage corresponding to the grey scale 0 of the blue sub-pixels to be greater than the actual data voltage corresponding to the grey scale 0 of the red sub-pixels.

In one embodiment, according to at least one embodiment of the present disclosure, the method for optimizing image quality further includes:

detecting a luminance range of the display panel;

when the luminance range of the display panel is within a predetermined luminance range, applying, in the display phase, when the grey scale value provided to sub-pixels having different colors is 0, the corresponding actual data voltages to the sub-pixels having different colors;

when the luminance range of the display panel is not within the predetermined luminance range, applying, in the display phase, when the grey scale value provided to the sub-pixel is 0, a predetermined data voltage to the sub-pixels.

In one embodiment, according to at least one embodiment of the present disclosure, the method for optimizing image quality further includes:

detecting, when temperatures of the display panel are in different temperature ranges, turn-on voltages of the sub-pixels having different colors to obtain maximum turn-on voltages of the sub-pixels having corresponding colors; and setting, in the gamma adjustment phase, the actual data voltages corresponding to the grey scale 0 according to the maximum turn-on voltages.

In one embodiment, the drive transistor in the sub-pixels is the p-type transistor; and the setting the actual data voltages according to the maximum turn-on voltages, includes: controlling a difference between the actual data voltage and the maximum turn-on voltage of the sub-pixels having the same color to be greater than or equal to a threshold voltage difference, the actual data voltage is greater than the maximum turn-on voltage, the threshold voltage difference is a positive value; or, the drive transistor in the sub-pixels is the n-type transistor; and the setting the actual data voltages according to the maximum turn-on voltages includes: controlling an absolute value of the difference between the actual data voltage and the maximum turn-on voltage of the sub-pixels having the same color to be greater than or equal to a threshold voltage difference, the actual data voltages is less than the maximum turn-on voltage, the threshold voltage difference is a positive value.

In one embodiment, a development verification phase is further included before the gamma adjustment phase, and the method for optimizing image quality further includes:

synchronously adjusting, in the development verification phase, when the temperatures of the display panel are in different temperature ranges, data voltages applied to all the sub-pixels having different colors in a pixel of the display panel to detect critical voltages of the pixel and obtain a maximum critical voltage;

setting, in the gamma adjustment phase, the actual data voltages corresponding to the grey scale 0 according to the maximum critical voltage.

In one embodiment, the drive transistor in the sub-pixels is the p-type transistor; and the setting the actual data voltages according to the maximum critical voltages includes: controlling differences between the actual data voltages and the maximum critical voltage to be greater than or equal to a threshold voltage difference, the actual data voltages are greater than the maximum critical voltage, the threshold voltage difference is a positive value; or, the drive transistor in the sub-pixels is the n-type transistor; and the setting the actual data voltage according to the maximum critical voltage, includes: controlling absolute values of the differences between the actual data voltages and the maximum critical voltage to be greater than or equal to the threshold voltage difference, the actual data voltages are less than the maximum critical voltage, the threshold voltage difference is a positive value.

In one embodiment, the drive transistor in the sub-pixels are the p-type transistor; and the method for optimizing image quality further includes:

controlling and adjusting, in the display phase, according to a maximum value among black image data voltages of respective sub-pixels, a voltage value of a general power supply voltage of an analogue circuit and a voltage value of a gate turn-off voltage, and controlling and adjusting an absolute value of the voltage value of a gate turn-on voltage;

the black image data voltages are the actual data voltages corresponding to the grey scale 0.

In a second aspect, a module for optimizing image quality is applied by an embodiment of the present disclosure, the module for optimizing image quality is applied to a display panel comprising a plurality of sub-pixels and includes a setting unit and an applying unit; where the setting unit is configured to control and set, in a gamma adjustment phase, actual data voltages corresponding to a grey scale 0 of respective sub-pixels having different colors, and control at least two of the actual data voltages corresponding to the grey scale 0 of the sub-pixels having different colors to be different from each other, to control a gamma curve of the sub-pixels to make an absolute value of a luminance difference between luminance of the gamma curve corresponding to each grey scale value and luminance of a standard gamma curve corresponding to the grey scale value less than a predetermined luminance difference; the predetermined luminance difference is greater than 0; and the applying unit is configured to apply, in a display phase, when a grey scale value provided to the sub-pixels having different colors is 0, the corresponding actual data voltages to the sub-pixels having different colors.

In one embodiment, a drive transistor in the sub-pixels is a p-type transistor; and the setting unit is configured to: set an actual data voltage corresponding to the grey scale 0 of green sub-pixels to be less than an actual data voltage corresponding to the grey scale 0 of red sub-pixels; and/or; set an actual data voltage corresponding to the grey scale 0 of blue sub-pixels to be less than the actual data voltage corresponding to the grey scale 0 of the red sub-pixels; or, a drive transistor in the sub-pixels is the n-type transistor; and the setting unit is configured to: set the actual data voltage corresponding to the grey scale 0 of the green sub-pixels to be greater than the actual data voltage corresponding to the grey scale 0 of the red sub-pixels; and/or; set the actual data voltage corresponding to the grey scale 0 of the blue sub-pixels to be greater than the actual data voltage corresponding to the grey scale 0 of the red sub-pixels.

In one embodiment, according to at least one embodiment of the present disclosure, the module for optimizing image quality further includes a luminance detection unit; where the luminance detection unit is configured to detect a luminance range of the display panel;

the applying unit is configured to, when the luminance range of the display panel is within a predetermined luminance range, apply, in the display phase, when the grey scale value provided to the sub-pixels having different colors is 0, the corresponding actual data voltages to the sub-pixels having different colors; the applying unit is further configured to, when the luminance range of the display panel is within a predetermined luminance range, apply, in the display phase, when the grey scale value provided to the sub-pixels is 0, a predetermined data voltage to the sub-pixels.

In one embodiment, according to at least one embodiment of the present disclosure, the module for optimizing image quality further includes a temperature detection unit; where the temperature detection unit is configured to detect, when temperatures of the display panel are in different temperature ranges, turn-on voltages of the sub-pixels having different colors to obtain maximum turn-on voltages of the sub-pixels having corresponding colors; and the setting unit is further configured to, when the luminance range of the display panel is within the predetermined luminance range or the luminance range of the display panel is the predetermined luminance range, in the gamma adjustment phase, set the actual data voltages according to the maximum turn-on voltages.

In one embodiment, according to at least one embodiment of the present disclosure, the module for optimizing image quality further includes a temperature detection unit; where the temperature detection unit is configured to, in a development verification phase before the gamma adjustment phase, when the temperatures of the display panel are in different temperature ranges, synchronously adjust data voltages applied to all the sub-pixels having different colors in a pixel of the display panel to detect critical voltages of the pixel and obtain a maximum critical voltage;

the setting unit is further configured to set, in the gamma adjustment phase, the actual data voltages corresponding to the grey scale 0 according to the maximum critical voltage.

In one embodiment, the drive transistor in the sub-pixels is the p-type transistor; and the module for optimizing image quality further includes: an adjustment unit configured to, in a display phase, according to a maximum value among black image data voltages of the sub-pixels, control and adjust a voltage value of a general power supply voltage of an analogue circuit and a voltage value of a gate turn-off voltage, and control and adjust an absolute value of the voltage value of a gate turn-on voltage.

BRIEF DESCRIPTION OF THE DRAWINGS

FIG. 4C shows a gamma curve of blue sub-pixels in at least one embodiment of the present disclosure;

FIG. 5 shows a schematic diagram illustrating a luminance proportion values R01 of the red sub-pixels corresponding to a voltage VR0 of black image data of the red sub-pixels, a voltage VG0 of black image data of the green sub-pixels, and a voltage VB0 of black image data of blue sub-pixels;

FIG. 6 shows a structural diagram of a module for optimizing image quality in accordance with at least one embodiment of the present disclosure;

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

Figure 1:
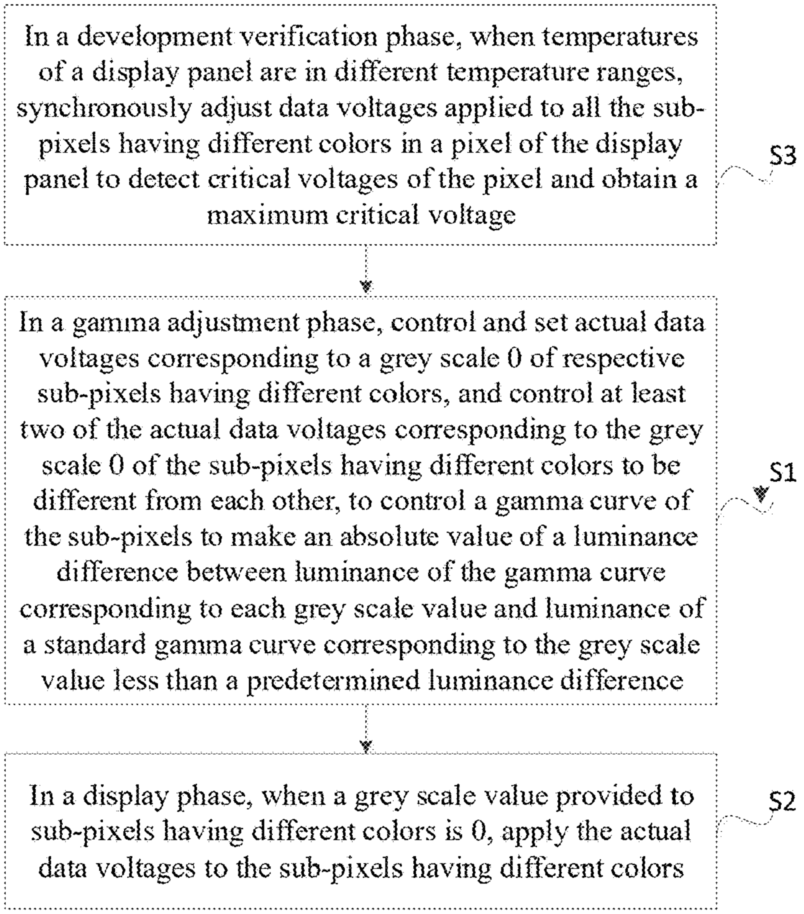
FIG. 1 shows a flowchart of a method for optimizing image quality in accordance with an embodiment of the present disclosure.

A method for optimizing image quality is provided by an embodiment of the present disclosure. As shown in FIG. 1, the method for optimizing image quality is applied to a display panel comprising a plurality of sub-pixels and includes steps S1 and S2:

In step S1: in a gamma adjustment phase, actual data voltages corresponding to a grey scale 0 of respective sub-pixels having different colors are controlled and set, and at least two of the actual data voltages corresponding to the grey scale 0 of the sub-pixels having different colors are controlled to be different from each other, to control a gamma curve of the sub-pixels to make an absolute value of a luminance difference between luminance of the gamma curve corresponding to each grey scale value and luminance of a standard gamma curve corresponding to the grey scale value less than a predetermined luminance difference; the predetermined luminance difference is greater than 0.

In step S2: in a display phase, when a grey scale value provided to the sub-pixels having different colors is 0, the actual data voltages are applied to the sub-pixels having different colors.

With the method for optimizing image quality according to the embodiment of the present disclosure, actual black image data voltages (i.e., the actual data voltages corresponding to a grey scale 0) of respective sub-pixels having different colors are controlled and set, and at least two of the actual data voltages corresponding to the grey scale 0 of the sub-pixels having different colors are controlled to be different from each other, to control the gamma curve of the sub-pixels such that the gamma curve is closer to the standard gamma curve, namely, the absolute value of the luminance difference between the luminance of the gamma curve corresponding to each grey scale value and the luminance of the standard gamma curve corresponding to the grey scale value less than the predetermined luminance difference; and in the display phase, when the grey scale value provided to the sub-pixels having different colors is 0, the corresponding actual data voltages are applied to the sub-pixels having different colors. Therefore, the problems of attenuation and uneven gray scale transition at low gray scale monochrome brightness due to parasitic capacitance and lateral leakage between sub-pixels are improved.

In at least one embodiment of the present disclosure, when the display panel includes red sub-pixels, green sub-pixels, and blue sub-pixels, in the gamma adjustment phase, the actual data voltages corresponding to the grey scale 0 of respective sub-pixels having different colors are controlled and set, and at least two of the actual data voltages corresponding to the grey scale 0 of the sub-pixels having different colors are controlled to be different from each other, so that an absolute value of a luminance difference between luminance of the gamma curve of the red sub-pixels corresponding to each grey scale value and the luminance of the standard gamma curve corresponding to the grey scale value is less than the predetermined luminance difference, an absolute value of a luminance difference between luminance of the gamma curve of the green sub-pixels corresponding to each grey scale value and the luminance of the standard gamma curve corresponding to the grey scale value is less than the predetermined luminance difference, and an absolute value of a luminance difference between luminance of the gamma curve of the blue sub-pixels corresponding to each grey scale value and the luminance of the standard gamma curve corresponding to the grey scale value is less than the predetermined luminance difference.

In particular implementation, the predetermined luminance difference may be selected according to an actual situation (the predetermined luminance difference may be set to be smaller), to make the gamma curve of the red sub-pixels close to the standard gamma curve, the gamma curve of the green sub-pixels close to the standard gamma curve, and the gamma curve of the blue sub-pixels close to the standard gamma curve.

In at least one embodiment of the present disclosure, the method for optimizing image quality may further include:

detecting a luminance range of the display panel;

when the luminance range of the display panel is within the predetermined luminance range, applying, applying in the display phase, when the grey scale value provided to sub-pixels having different colors is 0, the corresponding actual data voltages to the sub-pixels having different colors;

when the luminance range of the display panel is not within the predetermined luminance range, applying, in the display phase, when the grey scale value provided to the sub-pixels is 0, a predetermined data voltage to the sub-pixel.

In at least one embodiment of the present disclosure, the actual data voltages corresponding to the gray scale 0 of the sub-pixels having different colors may be set in a low luminance range, for example, the predetermined luminance range may be greater than or equal to 0 and less than or equal to 100 nits, but is not limited thereto.

In particular implementation, the luminance range of the display panel can be adjusted, for example, when the display panel is a display screen of a mobile phone, the luminance range of the display panel can be adjusted by pulling a luminance adjustment bar. In general, when the display panel is in the low luminance range, luminance attenuation has a greater impact on a display effect.

In one embodiment, the predetermined data voltage may be 6.1 V, but is not limited thereto.

For example, when the luminance range of the display panel is greater than or equal to 0 nits and less than or equal to 300 nits, the actual data voltages corresponding to the gray scale 0 of respective sub-pixels may not be set in the gamma adjustment phase to make the absolute value of the luminance difference between the luminance of the gamma curve corresponding to each gray scale value and the luminance of the standard gamma curve corresponding to the gray scale value less than the predetermined luminance difference, but the predetermined data voltage may be applied to the sub-pixels directly in the display phase when the gray scale value provided to the sub-pixels is 0.

The method for optimizing image quality described in at least one embodiment of the present disclosure can be applied to the field of active-matrix organic light-emitting diode (AMOLED) display, and the display panel may be an AMOLED display panel.

In the related art, in the gamma adjustment phase, the same gray scale value is provided to the red sub-pixels, the green sub-pixels and the blue sub-pixels to detect corresponding gamma curves, and gamma adjustment is performed according to the gamma curves. However, since there is a case where lateral leakage may occur from the green sub-pixels and the blue sub-pixels towards the red sub-pixels, when a drive transistor in the sub-pixels is a p-type transistor, the actual data voltage corresponding to each grey-scale value of the red sub-pixels obtained in the gamma adjustment phase is higher, and when the drive transistor in the sub-pixel is an n-type transistor, the actual data voltage corresponding to each grey-scale value of the red sub-pixels obtained in the gamma adjustment phase is lower. Then, in the display phase, when a red monochrome image is displayed, for example, when the grey scale value of the red sub-pixels is 127, and the grey scale value of the blue sub-pixels and the grey scale value of the green sub-pixels are both 0. As the blue sub-pixels and the green sub-pixels cannot leak current to the red sub-pixels at this time, the luminance of the red sub-pixels is insufficient, and the problem of attenuation of monochrome brightness may occur.

Based on this, a method for optimizing image quality is provided by at least one embodiment of the present disclosure. In the gamma adjustment phase, actual data voltages corresponding to the grey scale 0 of respective sub-pixels having different colors are controlled and set, and at least two of the actual data voltages corresponding to the grey scale 0 of the sub-pixels having different colors are controlled to be different from each other, so that the respective gamma curves of sub-pixels having different colors are all close to the standard gamma curve.

In one embodiment, when the drive transistor in the sub-pixels is the p-type transistor, the actual data voltage corresponding to the grey scale 0 of the blue sub-pixels and the actual data voltage corresponding to the grey scale 0 of the green sub-pixels may be both set to be less than the actual data voltage corresponding to the grey scale 0 of the red sub-pixels; when the drive transistor in the sub-pixels is the n-type transistor, the actual data voltage corresponding to the grey scale 0 of the blue sub-pixels and the actual data voltage corresponding to the grey scale 0 of the green sub-pixels may be both set to be greater than the actual data voltage corresponding to the grey scale 0 of the red sub-pixels; and in a display phase, when the grey scale value provided to the sub-pixels having different colors is 0, the actual data voltages are applied to the sub-pixels having different colors, so that when the red monochrome image is displayed, at this time, the gray scale value of the blue sub-pixels and the gray scale value of the green sub-pixels are 0, but as the above-mentioned setting of the actual data voltages, the blue sub-pixels and the green sub-pixels generate a dark state current to leak current to the red sub-pixels, thereby ensuring the display brightness of the red monochrome picture.

Figure 2:
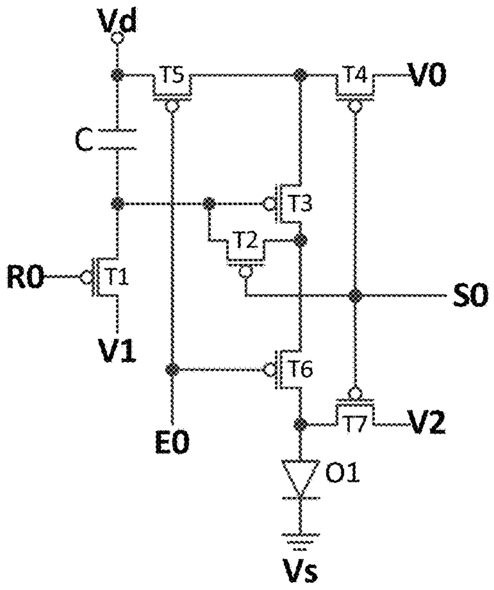
FIG. 2 shows a circuit diagram of at least one embodiment of sub-pixels in a display panel to which the method for optimizing image quality according to at least one embodiment of the present disclosure is applied.

As shown in FIG. 2, the sub-pixels according to at least one embodiment may include a first transistor T1, a second transistor T2, a drive transistor T3, fourth transistor T4, a fifth transistor T5, a sixth transistor T6, a seventh transistor T7, a storage capacitor C, and an organic light-emitting diode O1.

A gate of T1 is electrically connected to a reset control line R0.

A gate of T5 and a gate of T6 are both electrically connected to a light-emitting control line E0.

A gate of T2, a gate of T4, and a gate of T7 are all electrically connected to a scanning line S0.

A source of T4 is connected to a data voltage V0; a source of T1 is connected to a first initialization voltage V1, and a source of T7 is connected to a second initialization voltage V2.

In FIG. 2, a reference number Vd denotes a first power supply voltage, and a reference number Vs denotes a second power supply voltage.

In the embodiment shown in FIG. 2, a voltage value of Vs may be 0 V, but is not limited thereto.

In the embodiment shown in FIG. 2, all transistors are p-type thin film transistors.

In particular implementation, the transistors may also be n-type transistors, and the transistors may be field effect transistors and thin film transistors, but are not limited thereto.

Figure 3:
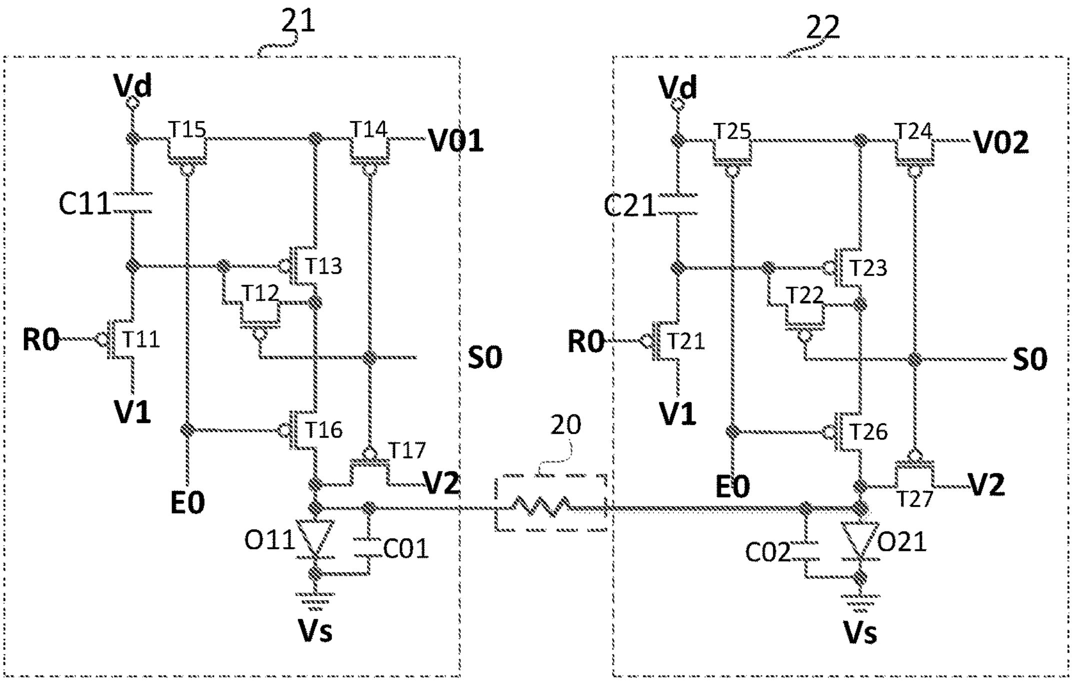
FIG. 3 shows a schematic diagram illustrating a lateral leakage channel between at least one embodiment of red sub-pixels and at least one embodiment of green sub-pixels.

As shown in FIG. 3, a lateral leakage channel 20 exists between the red sub-pixels 21 and the green sub-pixels;

In FIG. 3, a reference number T11 denotes a first transistor included in the red sub-pixels 21, a reference number T12 denotes a second transistor included in the red sub-pixels 21, a reference number T13 denotes a drive transistor included in the red sub-pixels 21, a reference number T14 denotes a fourth transistor included in the red sub-pixels 21, a reference number T15 denotes a fifth transistor included in the red sub-pixels 21, a reference number T16 denotes a sixth transistor included in the red sub-pixels 21, a reference number T17 denotes a seventh transistor included in the red sub-pixels 21, a reference number C11 denotes a storage capacitor included in the red sub-pixels 21, and a reference number O11 denotes an organic light-emitting diode included in the red sub-pixels 21.

C01 is a parasitic capacitance between an anode of O111 and a cathode of O11.

A reference number T21 denotes a first transistor included in the green sub-pixels 22, a reference number T22 denotes a second transistor included in the green sub-pixels 22, a reference number T23 denotes a drive transistor included in the green sub-pixels 22, a reference number T24 denotes a fourth transistor included in the green sub-pixels 22, a reference number T25 denotes a fifth transistor included in the green sub-pixels 22, a reference number T26 denotes a sixth transistor included in the green sub-pixels 22, a reference number T27 denotes a seventh transistor included in the green sub-pixels 22, a reference number C21 denotes a storage capacitor included in the green sub-pixels 22, and a reference number O21 denotes an organic light-emitting diode included in the green sub-pixels 22.

C02 is a parasitic capacitance between an anode of O21 and a cathode of O21.

In FIG. 3, a reference number V01 denotes a red data voltage, a reference number V02 denotes a green data voltage, a reference number Vd denotes a first power supply voltage, a reference number Vs denotes a second power supply voltage, a reference number R0 denotes a reset control line, a reference number E0 denotes a light-emitting control line, a reference number S0 denotes a scanning line, a reference number V1 denotes a first initialization voltage, and a reference number V2 denotes a second initialization voltage.

In one embodiment, the drive transistor in the sub-pixels is the p-type transistor; and the step that at least two of the actual data voltages corresponding to the grey scale 0 of the sub-pixels having different colors are controlled to be different from each other includes:

setting an actual data voltage corresponding to the grey scale 0 of the green sub-pixels to be less than an actual data voltage corresponding to the grey scale 0 of the red sub-pixels; and/or;

setting an actual data voltage corresponding to the grey scale 0 of the blue sub-pixels to be less than the actual data voltage corresponding to the grey scale 0 of the red sub-pixels.

In actual operation, when the drive transistor in the sub-pixels is the p-type transistor, the actual data voltage corresponding to the grey scale 0 of the green sub-pixels may be set to be less than the actual data voltage corresponding to the grey scale 0 of the red sub-pixels; and/or; the actual data voltage corresponding to the grey scale 0 of the blue sub-pixels may be to be less than the actual data voltage corresponding to the grey scale 0 of the red sub-pixels, so that the problem of attenuation of monochrome brightness due to lateral leakage is improved.

For example, when the drive transistor in the sub-pixels is the p-type transistor, the actual data voltage corresponding to the grey scale 0 of the red sub-pixels may be set as 6.1 V, the actual data voltage corresponding to the grey scale 0 of the green sub-pixels may be set as 5.4 V, and the actual data voltage corresponding to the grey scale 0 of the blue sub-pixels may be set as 5.4 V; the actual data voltages are greater than turn-on voltages of respective sub-pixels.

In at least one embodiment of the present disclosure, a turn-on voltage of the sub-pixels refers to:

when the drive transistor in the sub-pixels is the p-type transistor, the sub-pixels can emit light when a data voltage applied to the sub-pixels having a color is less than a turn-on voltage of the sub-pixels having the same color, and the luminance of the sub-pixels having the color is greater than or equal to a predetermined light-emitting luminance when the data voltage applied to the sub-pixels having the color is greater than or equal to the turn-on voltage of the sub-pixels having the same color; and when the drive transistor of the sub-pixels is the n-type transistor, the sub-pixels can emit light when the data voltage applied to the sub-pixels having the color is greater than the turn-on voltage of the sub-pixels having the same color, and the sub-pixels having the color do not emit light or the luminance of the sub-pixels having the color is less than the predetermined emission luminance when the data voltage applied to the sub-pixels is less than the turn-on voltage of the sub-pixels having the same color.

In at least one embodiment of the present disclosure, the predetermined light-emitting luminance may be, for example, 0.001 nits or 0.0005 nits, depending on an actual situation such as video definition, but is not limited thereto.

In actual operation, the turn-on voltage of the sub-pixels is related to a potential of the cathode of the organic light-emitting diode and a light-on voltage of the organic light-emitting diode.

In one embodiment, a light-on voltage of the organic light-emitting diode in the red sub-pixels is less than or equal to a light-on voltage of the organic light-emitting diode in the green sub-pixels, and the light-on voltage of the organic light-emitting diode in the green sub-pixels is less than or equal to aa light-on voltage of the organic light-emitting diode in the blue sub-pixels.

In particular implementation, in the gamma adjustment phase, the actual data voltage corresponding to the grey scale 0 of red sub-pixels, the actual data voltage corresponding to the grey scale 0 of green sub-pixels and the actual data voltage corresponding to the grey scale 0 of blue sub-pixels can be adjusted, and the final actual data voltages are determined by the obtained gamma curves of the sub-pixels having different colors.

Figure 4A:
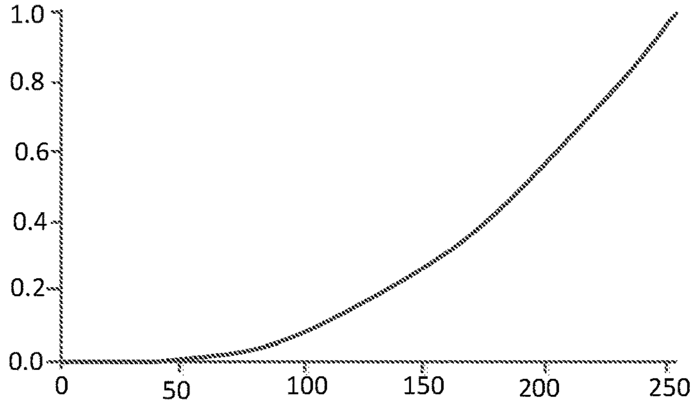
FIG. 4A shows a gamma curve of the red sub-pixels in at least one embodiment of the present disclosure.
Figure 4B:
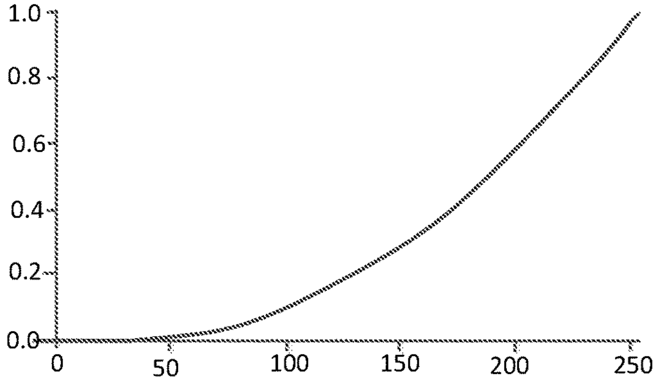
FIG. 4B shows a gamma curve of green sub-pixels in at least one embodiment of the present disclosure.

When the actual data voltage corresponding to the grey scale 0 of the red sub-pixels is set to 6.1 V, the actual data voltage corresponding to the grey scale 0 of the green sub-pixels is 5.4 V, and the actual data voltage corresponding to the grey scale 0 of the blue sub-pixels is 5.4 V, FIG. 4A shows a gamma curve of the red sub-pixels, FIG. 4B shows a gamma curve of the green sub-pixels, and FIG. 4C shows a gamma curve of the blue sub-pixels. As can be seen from FIGS. 4A, 4B and 4C, the gamma curve of red sub-pixels, the gamma curve of green sub-pixels, and the gamma curve of blue sub-pixels are all close to the standard gamma curve.

In FIGS. 4A, 4B and 4C, a horizontal axis is the gray scale value, and a vertical axis is a ratio of an actual luminance to the maximum luminance.

In at least one embodiment of the present disclosure, it can be determined whether the adjustment of a black image data voltage (the black image data voltage is an actual data voltage corresponding to the grey scale 0) can reach an expectation by detecting a luminance ratio value of each color image;

In actual detection, when the gray scale value is set as 127, for example, the grey scale value of the red sub-pixels, the grey scale value of the green sub-pixels and the grey scale value of the blue sub-pixels may be set as 127, corresponding data voltages are respectively applied to the red sub-pixels, green sub-pixels and blue sub-pixels. Luminance Wlum of a white image, a x color coordinate Wx of the white image, and a y color coordinate Wy of the white image are detected.

Then, the grey scale value of the red sub-pixels is set as 127, and the grey scale value of the green sub-pixels and the grey scale value of the blue sub-pixels are set as 0, then a red data voltage corresponding to the grey scale value 127 may be provided to the red sub-pixels, a corresponding black image data voltage is applied to the green sub-pixels, and a corresponding black image data voltage is applied to the blue sub-pixels. Luminance Rlum of the red image, the x color coordinate Rx of the red image, and the y color coordinate Ry of the red image are detected.

The grey scale value of green the sub-pixels is set as 127, and the grey scale value of the red sub-pixels and the grey scale value of the blue sub-pixels are set as 0, then a green data voltage corresponding to the grey scale value 127 may be provided to the green sub-pixels, a corresponding black image data voltage is applied to the red sub-pixels, and the corresponding black image data voltage is applied to the blue sub-pixels, and the luminance Glum of the green image, the x color coordinate Gx of the green image, and the y color coordinate Gy of the green image are detected.

The grey scale value of the blue sub-pixels is set as 127, and the grey scale value of the red sub-pixels and the grey scale value of the green sub-pixels are set as 0, then a blue data voltage corresponding to the grey scale value 127 may be provided to the blue sub-pixels, the corresponding black image data voltage is applied to the red sub-pixels, and the corresponding black image data voltage is applied to the green sub-pixels, and the luminance Blum of the blue image, the x color coordinate Bx of the blue image, and the y color coordinate By of the blue image are detected.

Then, a ratio value of blue RB and a ratio value of red RR can be obtained according to the following formula with the obtained parameters.

$$RB=(By\times[Wy(Gx-Rx)+Ry(Wx-Gx)+Gy(Rx-Wx)])/(Gy\times[Wy(Rx-Bx)+By(Wx-Rx)+Ry(Bx-Wx)]);$$

$$RR=(RB\times Ry(Wx-Bx))/(By(Rx-Wx))+Ry/(Gx\times(Wx-Gx)\times(Rx-Wx)).$$

That is, RR is equal to a sum of (RB×Ry(Wx−Bx))/(By(Rx−Wx)) and Ry/(Gx×(Wx−Gx)×(Rx−Wx)).

Then corresponding theoretical luminance of red LR, theoretical luminance of green LG and theoretical luminance of blue LB can be obtained by calculation according to Wlum, RB and RR.

$$LR=W\text{lum}\times RR/(RB+1+RR);$$

$$LB=W\text{lum}\times RB/(RB+1+RR);$$

$$LG=W\text{lum}-LR-LB.$$

Then a luminance ratio value corresponding to red sub-pixels R01, a luminance ratio value corresponding to green sub-pixels R02, and a luminance ratio value corresponding to blue sub-pixels R03 are as follows:

$$R01=R\text{lum}/LR;$$

$$R02=G\text{lum}/LG;$$

$$R03=B\text{lum}/LB.$$

In actual operation, the larger the luminance ratio value is, the better, as it means that the actual luminance is closer to the theoretical luminance. When the luminance ratio value corresponding to the red sub-pixels R01 can reach an expectation, R02 and R03 also reach the expectation, and therefore R01 can be calculated. For example, as shown in FIG. 5, when the black image data voltage of the red sub-pixels VR0, the black image data voltage of the green sub-pixels VG0, and the black image data voltage of the blue sub-pixels VB0 are all 6.1 V, R01 may be equal to 0.35; when VR0 is equal to 6.1 V, and VG0 and VB0 are both 5.9 V, R01 may be equal to 0.4; when VR0 is equal to 6.1 V, and VG0 and VB0 are both 5.8 V, R01 may be equal to 0.47; when VR0 is equal to 6.1 V, and VG0 and VB0 are both 5.4 V, R01 may be equal to 0.57. Then, in the gamma adjustment phase and the display phase, VR0 may be set to 6.1 V, and VG0 and VB0 may be set to 5.4 V.

In one embodiment, the drive transistor in the sub-pixels is the n-type transistor; and the step that at least two of the actual data voltages corresponding to the grey scale 0 of the sub-pixels having different colors are controlled to be different from each other, includes:

- setting the actual data voltage corresponding to the grey scale 0 of the green sub-pixels to be greater than the actual data voltage corresponding to the grey scale 0 of the red sub-pixels; and/or;
- setting the actual data voltage corresponding to the grey scale 0 of the blue sub-pixels to be greater than the actual data voltage corresponding to the grey scale 0 of the red sub-pixels.

In actual operation, when the drive transistor in the sub-pixels is the n-type transistor, the actual data voltage corresponding to the grey scale 0 of the green sub-pixels may be set to be greater than the actual data voltage corresponding to the grey scale 0 of the red sub-pixels; and/or; the actual data voltage corresponding to the grey scale 0 of the blue sub-pixels is set to be greater than the actual data voltage corresponding to the grey scale 0 of the red sub-pixels, so that the problem of attenuation of monochrome brightness due to lateral leakage is improved.

In at least one embodiment of the present disclosure, the predetermined luminance range may be greater than or equal to a minimum predetermined luminance and less than or equal to a maximum predetermined luminance, the maximum predetermined luminance is less than a preset luminance value, but not limited thereto.

In one embodiment, the minimum predetermined luminance may be 0 nits, and the maximum predetermined luminance may be 100 nits, but are not limited thereto; the minimum predetermined luminance and the maximum predetermined luminance may be set according to an actual situation.

In particular implementation, at different temperatures, since a shift in light performance due to changes in current curves of thin film transistors (TFTs) and light-emitting devices, the actual data voltages corresponding to the gray scale 0 can also be set according to the turn-on voltages of the sub-pixels or critical voltages of the pixel detected at different temperatures, to ensure the display effect of the display panel at a normal temperature.

In at least one embodiment of the present disclosure, the method for optimizing image quality may further include:

- when the temperatures of the display panel are in different temperature ranges, the turn-on voltages of the sub-pixels having different colors are detected to obtain maximum turn-on voltages of the sub-pixels having corresponding colors; and
- in the gamma adjustment phase, the actual data voltages are set according to the maximum turn-on voltages.

In particular implementation, a temperature of the display panel refers to a temperature of the display panel itself.

The step that when the temperatures of the display panel are in different temperature ranges, the turn-on voltages of sub-pixels having different colors are detected to obtain the maximum turn-on voltages of sub-pixels having corresponding colors may refer to:

- when the display panel includes the red sub-pixels, the green sub-pixels and the blue sub-pixels, turn-on voltages of the red sub-pixels, turn-on voltages of the green sub-pixels and turn-on voltages of the blue sub-pixels at different temperature ranges are detected, to obtain a maximum turn-on voltage of the red sub-pixels, a maximum turn-on voltage of the green sub-pixels and a maximum turn-on voltage of the blue sub-pixels at the temperature ranges.

In at least one embodiment of the present disclosure, the different temperature ranges may be: a high temperature range, a normal temperature range, and a low temperature range. For example, the high temperature range may be about 60 degrees centigrade, the normal temperature range may be about 25 degrees centigrade, and the low temperature range may be about minus 20 degrees centigrade, but are not limited thereto.

In at least one embodiment of the present disclosure, the maximum turn-on voltage of the sub-pixels having corresponding color can be detected before the gamma adjustment phase.

In one embodiment, the drive transistor in the sub-pixels is the p-type transistor; and the step that the actual data voltages are set according to the maximum turn-on voltages, includes:

a difference between the actual data voltage and the maximum turn-on voltage of the sub-pixels having the same color is controlled to be greater than or equal to a threshold voltage difference, the actual data voltages is greater than the maximum turn-on voltage, the threshold voltage difference is a positive value.

In one embodiment, the drive transistor in the sub-pixels is the n-type transistor; and the step that the actual data voltages are set according to the maximum turn-on voltages, includes:

an absolute value of the difference between the actual data voltage and the maximum turn-on voltage of the sub-pixels having the same color is controlled to be greater than or equal to the threshold voltage difference, the actual data voltage is less than the maximum turn-on voltage, the threshold voltage difference is a positive value.

In one embodiment, a development verification phase is further included before the gamma adjustment phase, and the method for optimizing image quality may further include: (Step S3) in the development verification phase, when the temperatures of the display panel are in different temperature ranges, data voltages applied to all the sub-pixels having different colors in a pixel of the display panel are synchronously adjusted to detect critical voltages of the pixel and obtain a maximum critical voltage of the pixel;

in the gamma adjustment phase, the actual data voltages corresponding to the grey scale 0 are set according to the maximum critical voltage.

In at least one embodiment of the present disclosure, the step that data voltages applied to all sub-pixels having different colors in the pixel of the display panel are synchronously adjusted, refers to: the data voltages of all sub-pixels having different colors in the pixel are adjusted, and the data voltages of all the sub-pixels having different colors are set to be the same;

the step that data voltages applied to all the sub-pixels having different colors in the pixel of the display panel are synchronously adjusted so as to detect the critical voltage of the pixel, refers to: the data voltages of all sub-pixels having different colors in the pixel are synchronously adjusted to obtain a critical voltage at which the pixel is switched from not emitting light to emitting light.

In actual operation, initial data voltages applied to sub-pixels having different colors may be set to 6.1 V, and then the data voltages applied to the sub-pixels having different colors may be sequentially decreased in steps of 0.1 V. It is assumed that when the data voltages applied to the sub-pixels having different colors is 5.2 V, the pixel does not emit light, and when the data voltages applied to the sub-pixels having different colors is 5.1 V, the pixel emits light, then the critical voltage is 5.1 V.

In at least one embodiment of the present disclosure, the step that when the temperatures of the display panel are in different temperature ranges, the data voltages applied to all the sub-pixels having different colors in the pixel of the display panel are synchronously adjusted to detect the critical voltages of the pixel and obtain the maximum critical voltage of the pixel, may refer to:

when the temperatures of the display panel are in different temperature ranges, the critical voltages of the pixel are detected, and a maximum one of the critical voltages in the different temperature ranges is set as a maximum critical voltage. For example, when the temperature ranges are divided into the high temperature range, the low temperature range and the normal temperature range, it is detected that the critical voltage of the pixel is 5.2 V in the high temperature range, and the critical voltage of the pixel is 5.1 V in the normal temperature range and the low temperature range, then the maximum critical voltage of the pixel is 5.2 V, but is not limited thereto.

In particular implementation, in the development verification phase, each batch of display panels needs to be tested (process conditions may be changed in each batch, which affects properties of the display panels). After the process conditions for mass production of display panels are finally confirmed, the critical voltages of the pixel are tested at different temperature ranges to validate the gamma adjustment algorithm for display panels of mass production. That is, the operation of detecting the critical voltages of the pixel at different temperature ranges is completed before the gamma adjustment phase.

In one embodiment, the drive transistor in the sub-pixels is the p-type transistor; and the step that the actual data voltages are set according to the maximum critical voltage, includes: differences between the actual data voltages and the maximum critical voltage are set to be greater than or equal to the threshold voltage difference, the actual data voltages are greater than the maximum critical voltage, the threshold voltage difference is a positive value.

In one embodiment, the drive transistor in the sub-pixels is the n-type transistor; and the step that the actual data voltages are set according to the maximum critical voltage, includes: the absolute values of the differences between the actual data voltages and the maximum critical voltage are controlled to be greater than or equal to the threshold voltage difference, the actual data voltages are less than the maximum critical voltage, the threshold voltage difference is a positive value.

In particular implementation, when a reliability test is performed, the critical voltage of the pixel may also be detected under extreme conditions. For example, the critical voltage detection may be performed when the display panel is lit in high humidity, or the critical voltage detection may be performed when the display panel is irradiated with ultraviolet rays.

For example, when the temperature of the display panel is minus 20 degrees centigrade, the critical voltage of the pixels is 5.2 V, when the temperature of the display panel is 25 degrees centigrade, the critical voltage of the pixels is 5.1 V, and when the temperature of the display panel is 60 degrees centigrade, the critical voltage of the pixels is 5.1 V, and it can be seen that a difference value of the critical voltages at different temperatures is 0.1 V, then the threshold voltage difference may be set as 0.2 V. When the temperature of the display panel is −20 degrees centigrade, difference between the black image data voltage of each sub-pixel and 5.2 V needs to be greater than or equal to 0.2 V, and when the temperature of the display panel is 25 degrees centigrade and 60 degrees centigrade, the difference between the black image data voltage of each sub-pixel and 5.1 V needs to be greater than or equal to 0.2 V. In at least one embodiment of the present disclosure, the difference between the black image data voltage of each sub-pixel and 5.2 V may be set to be greater than or equal to 0.2 V, but is not limited thereto.

In at least one embodiment of the present disclosure, on a premise that the display panel is provided with a temperature sensor, the black image data voltage may also be adjusted in real time according to a real-time temperature of the display panel.

In particular implementation, when the drive transistor in the sub-pixels is the p-type transistor, according to at least one embodiment of the present disclosure, the method for optimizing image quality may further include:

in the display phase, according to a maximum value of black image data voltages of the sub-pixels, controlling and adjusting a voltage value of a general power supply voltage of an analogue circuit and a voltage value of a gate turn-off voltage, and controlling and adjusting an absolute value of the voltage value of a gate turn-on voltage;

the black image data voltages are the actual data voltages corresponding to the grey scale 0.

In at least one embodiment of the present disclosure, for example, when the black image data voltage of the red sub-pixels is 6.1 V, and the black image data voltage of the blue sub-pixels and the black image data voltage of the green sub-pixels are 5.4 V, the maximum value of the black image data voltages of the sub-pixels is 6.1 V.

The voltage value of the gate turn-off voltage can be adjusted according to the maximum value of the black image data voltages of the sub-pixels, the voltage value of the general power supply voltage of the analogue circuit can be adjusted according to the voltage value of the gate turn-off voltage, and as the gate turn-on voltage is obtained by conversion of the general power supply voltage of the analogue circuit, the voltage value of the gate turn-on voltage can be correspondingly adjusted according to the voltage value of the general power supply voltage of the analogue circuit.

For example, when the maximum value of the black image data voltages of the sub-pixels is 6.1 V, the voltage value of the gate turn-off voltage may be 6.4 V, the voltage value of the general power supply voltage of the analogue circuit may be 6.7 V, and the voltage value of the gate turn-on voltage may be adjusted correspondingly according to the voltage value of the general power supply voltage of the analogue circuit.

When the display panel displays, according to the maximum value of the black image data voltages of the sub-pixels, the voltage value of the general power supply voltage of the analogue circuit and the voltage value of the gate turn-off voltage may be dynamically adjusted, and the absolute value of the voltage value of the gate turn-on voltage may be dynamically adjusted.

In one embodiment, the general power supply voltage of the analogue circuit is a general power supply voltage supplied to the analogue circuit, and the gate turn-off voltage is a turn-off voltage supplied to the gate circuit. The gate turn-on voltage is a turn-on voltage supplied to the gate circuit.

The voltage value of the general power supply voltage of the analogue circuit is a positive value, and when the drive transistor in the sub-pixels is the p-type transistor, the voltage value of the gate turn-off voltage is a positive value, and the voltage value of the gate turn-on voltage is a negative value. When the display panel displays, on a premise of ensuring normal display, the absolute value of the voltage value of the general power supply voltage of the analogue circuit, the absolute value of the voltage value of the gate turn-off voltage and the absolute value of the voltage value of the gate turn-on voltage can be set to be lower, to reduce power consumption and crosstalk, thereby further improving the display effect and improving the competitiveness of the display panel.

A module for optimizing image quality is provided by an embodiment of the present disclosure. As shown in FIG. 6, the module for optimizing image quality is applied to a display panel comprising a plurality of sub-pixels and includes a setting unit 51 and an applying unit 52.

The setting unit 51 is configured to, in a gamma adjustment phase, control and set actual data voltages corresponding to a grey scale 0 of respective sub-pixels having different colors, and control at least two of the actual data voltages corresponding to the grey scale 0 of the sub-pixels having different colors to be different from each other, to control a gamma curve of the sub-pixels to make an absolute value of a luminance difference between luminance of the gamma curve corresponding to each grey scale value and luminance of a standard gamma curve corresponding to the grey scale value less than a predetermined luminance difference; the predetermined luminance difference is greater than 0.

The applying unit 52 is electrically connected to the setting unit 51, and is configured to apply, in a display phase, when the grey scale value provided to sub-pixels having different colors is 0, the corresponding actual data voltages to the sub-pixels having different colors.

With the module for optimizing image quality according to the embodiment of the present disclosure, the actual black image data voltages (i.e., actual data voltages corresponding to the grey scale 0) of respective sub-pixels having different colors are controlled and set, and at least two of the actual black image data voltages of the sub-pixels having different colors to be different from each other, so as to control the gamma curve of the sub-pixels such that the gamma curve is closer to the standard gamma curve, namely, the absolute value of the luminance difference between the luminance of the gamma curve corresponding to each grey scale value and the luminance of the standard gamma curve corresponding to the grey scale value is less than predetermined luminance difference; and in the display phase, when the grey scale value provided to the sub-pixels is 0, the actual data voltages are applied to the sub-pixels. Therefore, the problems of attenuation and uneven gray scale transition at low gray scale monochrome brightness due to parasitic capacitance and lateral leakage between sub-pixels are improved.

In one embodiment, a drive transistor in the sub-pixels is a p-type transistor; and the setting unit is configured to: set an actual data voltage corresponding to the grey scale 0 of green sub-pixels to be less than an actual data voltage corresponding to the grey scale 0 of red sub-pixels; and/or; set an actual data voltage corresponding to the grey scale 0 of blue sub-pixels to be less than the actual data voltage corresponding to the grey scale 0 of the red sub-pixels.

In one embodiment, the drive transistor in the sub-pixels is an n-type transistor; and the setting unit is configured to: set the actual data voltage corresponding to the grey scale 0 of the green sub-pixels to be greater than the actual data voltage corresponding to the grey scale 0 of the red sub-pixels; and/or; set the actual data voltage corresponding to the grey scale 0 of the blue sub-pixels to be greater than the actual data voltage corresponding to the grey scale 0 of the red sub-pixels.

Figure 7:
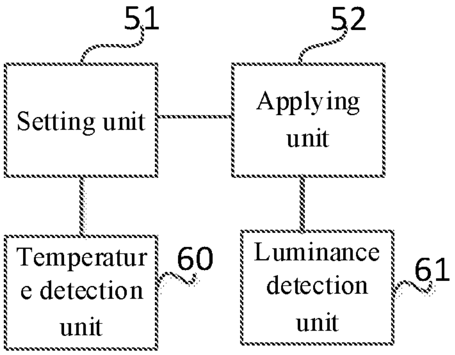
FIG. 7 shows a structural diagram of the module for optimizing image quality in accordance with at least one embodiment of the present disclosure.

In at least one embodiment of the present disclosure, as shown in FIG. 7, the module for optimizing image quality may further include a luminance detection unit 61. The luminance detection unit 61 is configured to detect a luminance range of the display panel.

The applying unit 52 is electrically connected to the luminance detection unit 61, and is configured to, when the luminance range of the display panel is within a predetermined luminance range, apply, in the display phase, when the grey scale value provided to sub-pixels having different colors is 0, the corresponding actual data voltages to the sub-pixels having different colors; The applying unit may be further configured to, when the luminance range of the display panel is within the predetermined luminance range, apply, in the display phase, when the grey scale value provided to the sub-pixels having different colors is 0, the predetermined data voltage is applied to the sub-pixels having different colors.

In particular implementation, at different environment temperatures, since a shift in light performance due to changes in current curves of thin film transistors (TFTs) and light-emitting devices, the actual data voltage corresponding to the gray scale 0 can also be set according to the turn-on voltages of the sub-pixels or critical voltages of the pixel detected at different temperatures, to ensure the display effect of the display panel at a normal temperature.

In one embodiment, as shown in FIG. 7, in at least one embodiment of the present disclosure, the module for optimizing image quality may further include a temperature detection unit 60.

The temperature detection unit 60 is configured to detect, when the temperatures of the display panel are in different temperature ranges, turn-on voltages of the sub-pixels having different colors to obtain maximum turn-on voltages of sub-pixels having corresponding colors.

The setting unit 51 is electrically connected to the temperature detection unit 60, and is further configured to, when the luminance range of the display panel is within a predetermined luminance range or the luminance range of the display panel is the predetermined luminance range, set, in the gamma adjustment phase, the actual data voltages according to the maximum turn-on voltages.

According to at least one embodiment of the module for optimizing image quality of the present disclosure as shown in FIG. 7, the actual data voltages corresponding to the gray scale 0 can also be set according to the turn-on voltages of the sub-pixels detected at different temperatures, to ensure the display effect of the display panel at the normal temperature.

In one embodiment, according to at least one embodiment of the present disclosure, the module for optimizing image quality further includes a temperature detection unit.

The temperature detection unit is configured to synchronously adjust, in a development verification phase before the gamma adjustment phase, when the temperatures of the display panel are in different temperature ranges, data voltages applied to all the sub-pixels having different colors in a pixel of the display panel to detect critical voltages of the pixel and obtain a maximum critical voltage.

The setting unit is further configured to set, in the gamma adjustment phase, the actual data voltages corresponding to the grey scale 0 according to the maximum critical voltage.

According to at least one embodiment of the module for optimizing image quality of the present disclosure, the actual data voltages corresponding to the gray scale 0 can also be set according to the critical voltages of the pixel detected at different temperatures, to ensure the display effect of the display panel at the normal temperature.

Figure 8:
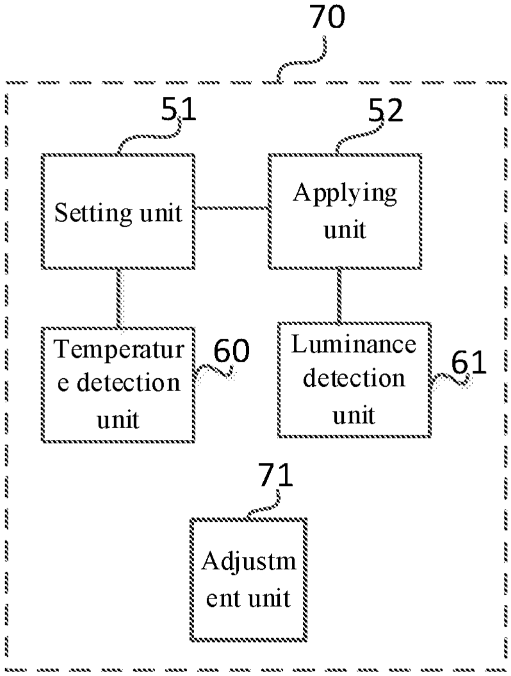
FIG. 8 shows a structural diagram of the module for optimizing image quality in accordance with at least one embodiment of the present disclosure.

In particular implementation, on a basis of the embodiment of the module for optimizing image quality shown in FIG. 7, as shown in FIG. 8, the drive transistor in the sub-pixels is the p-type transistor; and in at least one embodiment of the present disclosure, the module for optimizing image quality 70 may further include an adjustment unit 71.

The adjustment module 71 is configured to control and adjust, in the display phase, according to a maximum value among black image data voltages of the sub-pixels, a voltage value of a general power supply voltage of an analogue circuit and a voltage value of a gate turn-off voltage, and control and adjust an absolute value of the voltage value of a gate turn-on voltage.

When the display panel displays, according to the maximum value of the black image data voltages of the sub-pixels, the voltage value of the general power supply voltage of the analogue circuit and the voltage value of the gate turn-off voltage may be dynamically adjusted, and the absolute value of the voltage value of the gate turn-on voltage may be dynamically adjusted.

While the foregoing is directed to the preferred embodiments of the present disclosure, it will be understood by those skilled in the art that numerous modifications and adaptations may be made without departing from the principles of the disclosure, and such modifications and adaptations are intended to be within the scope of the disclosure.

What is claimed is:

1. A method for optimizing image quality, applied to a display panel comprising a plurality of sub-pixels and comprising:

controlling and setting, in a gamma adjustment phase, actual data voltages corresponding to a grey scale 0 of respective sub-pixels having different colors, and controlling at least two of the actual data voltages corresponding to the grey scale 0 of the sub-pixels having different colors to be different from each other, to control a gamma curve of the sub-pixels to make an absolute value of a luminance difference between luminance of the gamma curve corresponding to each grey scale value and luminance of a standard gamma curve corresponding to the grey scale value less than a predetermined luminance difference; the predetermined luminance difference is greater than 0; and the method further comprises:

detecting a luminance range of the display panel;

when the luminance range of the display panel is within a predetermined luminance range, applying, in a display phase, when a grey scale value provided to the sub-pixels having different colors is 0, the corresponding actual data voltages to the sub-pixels having different colors;

when the luminance range of the display panel is not within the predetermined luminance range, applying, in the display phase, when the grey scale value provided to the sub-pixel is 0, a predetermined data voltage to the sub-pixels;

wherein a development verification phase is further comprised before the gamma adjustment phase, and the method for optimizing image quality further comprises:

synchronously adjusting, in the development verification phase, when the temperatures of the display panel are in different temperature ranges, data voltages applied to all the sub-pixels having different colors in a pixel of the display panel to detect critical voltages of the pixel and obtain a maximum critical voltage; wherein the critical voltage of the pixel is a voltage when the pixel is switched from not emitting light to emitting light;

setting, in the gamma adjustment phase, the actual data voltages corresponding to the grey scale 0 according to the maximum critical voltage;

wherein the synchronously adjusting, in the development verification phase, when the temperatures of the display panel are in different temperature ranges, data voltages applied to all the sub-pixels having different colors in a pixel of the display panel to detect critical voltages of the pixel and obtain a maximum critical voltage, comprises:

when the temperatures of the display panel are in different temperature ranges, detecting critical voltages of the pixel, and setting a maximum one of the critical voltages in the different temperature ranges as the maximum critical voltage;

wherein black image data voltages are the actual data voltages corresponding to the grey scale 0.

2. The method for optimizing image quality according to claim 1, wherein in a case that a drive transistor in the sub-pixels is a p-type transistor; and the controlling at least two of the actual data voltages corresponding to the grey scale 0 of the sub-pixels having different colors to be different from each other comprises:

setting an actual data voltage corresponding to the grey scale 0 of green sub-pixels to be less than an actual data voltage corresponding to the grey scale 0 of red sub-pixels; and/or;

setting an actual data voltage corresponding to the grey scale 0 of blue sub-pixels to be less than the actual data voltage corresponding to the grey scale 0 of red sub-pixels.

3. The method for optimizing image quality according to claim 2, further comprises:

detecting, when temperatures of the display panel are in different temperature ranges, turn-on voltages of the sub-pixels having different colors to obtain maximum turn-on voltages of the sub-pixels having corresponding colors; and setting, in the gamma adjustment phase, the actual data voltages corresponding to the grey scale 0 according to the maximum turn-on voltages.

4. The method for optimizing image quality according to claim 1, wherein in a case that a drive transistor in the sub-pixels is an n-type transistor; and the controlling at least two of the actual data voltages corresponding to the grey scale 0 of the sub-pixels having different colors to be different from each other, comprises:

setting the actual data voltage corresponding to the grey scale 0 of the green sub-pixels to be greater than the actual data voltage corresponding to the grey scale 0 of the red sub-pixels; and/or;

setting the actual data voltage corresponding to the grey scale 0 of the blue sub-pixels to be greater than the actual data voltage corresponding to the grey scale 0 of the red sub-pixels.

5. The method for optimizing image quality according to claim 4, further comprises:

detecting, when temperatures of the display panel are in different temperature ranges, turn-on voltages of the sub-pixels having different colors to obtain maximum turn-on voltages of the sub-pixels having corresponding colors; and setting, in the gamma adjustment phase, the actual data voltages corresponding to the grey scale 0 according to the maximum turn-on voltages.

6. The method for optimizing image quality according to claim 1, further comprises:

detecting, when temperatures of the display panel are in different temperature ranges, turn-on voltages of the sub-pixels having different colors to obtain maximum turn-on voltages of the sub-pixels having corresponding colors; and setting, in the gamma adjustment phase, the actual data voltages corresponding to the grey scale 0 according to the maximum turn-on voltages.

7. The method for optimizing image quality according to claim 6, wherein the drive transistor in the sub-pixels is the p-type transistor; and the setting the actual data voltages according to the maximum turn-on voltages, comprises: controlling a difference between the actual data voltage and the maximum turn-on voltage of the sub-pixels having the same color to be greater than or equal to a threshold voltage difference, the actual data voltage is greater than the maximum turn-on voltage, the threshold voltage difference is a positive value; or, the drive transistor in the sub-pixels is the n-type transistor; and the setting the actual data voltages according to the maximum turn-on voltages, comprises: controlling an absolute value of the difference between the actual data voltage and the maximum turn-on voltage of the sub-pixels having the same color to be greater than or equal to the threshold voltage difference, the actual data voltage is less than the maximum turn-on voltage, the threshold voltage difference is a positive value.

8. The method for optimizing image quality according to claim 1, wherein the drive transistor in the sub-pixels is the p-type transistor; and the setting the actual data voltages according to the maximum critical voltages comprises: controlling differences between the actual data voltages and the maximum critical voltage to be greater than or equal to a threshold voltage difference, the actual data voltages are greater than the maximum critical voltage, the threshold voltage difference is a positive value; or, the drive transistor in the sub-pixels is the n-type transistor; and the setting the actual data voltages according to the maximum critical voltages comprises: controlling absolute values of the differences between the actual data voltages and the maximum critical voltages to be greater than or equal to the threshold voltage difference, the actual data voltages are less than the maximum critical voltages, the threshold voltage difference is a positive value.

9. The method for optimizing image quality according to claim 1, wherein the drive transistor in the sub-pixels is the p-type transistor; and the method for optimizing image quality further comprises:

controlling and adjusting, in the display phase, according to a maximum value among the black image data voltages of respective sub-pixels, a voltage value of a general power supply voltage of an analogue circuit and a voltage value of a gate turn-off voltage, and controlling and adjusting an absolute value of the voltage value of a gate turn-on voltage.

10. A module for optimizing image quality, applied to a display panel comprising a plurality of sub-pixels and comprising: a setting unit and an applying unit; wherein the setting unit is configured to control and set, in a gamma adjustment phase, actual data voltages corresponding to a grey scale 0 of respective sub-pixels having different colors, and control at least two of the actual data voltages corresponding to the grey scale 0 of the sub-pixels having different colors to be different from each other, to control a gamma curve of the sub-pixels to make an absolute value of a luminance difference between luminance of the gamma curve corresponding to each grey scale value and luminance of a standard gamma curve corresponding to the grey scale value less than a predetermined luminance difference; the predetermined luminance difference is greater than 0; and the module further comprising a luminance detection unit; wherein the luminance detection unit is configured to detect a luminance range of the display panel;

the applying unit is configured to, when the luminance range of the display panel is within a predetermined luminance range, apply, in a display phase, when a grey scale value provided to the sub-pixels having different colors is 0, the corresponding actual data voltages to the sub-pixels having different colors; the applying unit is further configured to, when the luminance range of the display panel is not within the predetermined luminance range, apply, in the display phase, when the grey scale value provided to the sub-pixels is 0, a predetermined data voltage to the sub-pixels;

wherein the module for optimizing image quality further comprises a temperature detection unit;

the temperature detection unit is configured to, in a development verification phase before the gamma adjustment phase, when the temperatures of the display panel are in different temperature ranges, synchronously adjust data voltages applied to all the sub-pixels having different colors in a pixel of the display panel to detect critical voltages of the pixel and obtain a maximum critical voltage; wherein the critical voltage of the pixel is a voltage when the pixel is switched from not emitting light to emitting light;

the setting unit is further configured to set, in the gamma adjustment phase, the actual data voltages corresponding to the grey scale 0 according to the maximum critical voltage;

wherein the applying unit is electrically connected to the setting unit, the applying unit is electrically connected to the luminance detection unit, and the setting unit is electrically connected to the temperature detection unit; and wherein the synchronously adjusting, in the development verification phase, when the temperatures of the display panel are in different temperature ranges, data voltages applied to all the sub-pixels having different colors in a pixel of the display panel to detect critical voltages of the pixel and obtain a maximum critical voltage, comprises:

when the temperatures of the display panel are in different temperature ranges, detecting critical voltages of the pixel, and setting a maximum one of the critical voltages in the different temperature ranges as the maximum critical voltage;

wherein black image data voltages are the actual data voltages corresponding to the grey scale 0.

11. The module for optimizing image quality according to claim 10, wherein a drive transistor in the sub-pixels is a p-type transistor; and the setting unit is configured to: set an actual data voltage corresponding to the grey scale 0 of green sub-pixels to be less than an actual data voltage corresponding to the grey scale 0 of red sub-pixels; and/or; set an actual data voltage corresponding to the grey scale 0 of blue sub-pixels to be less than the actual data voltage corresponding to the grey scale 0 of the red sub-pixels; or, the drive transistor in the sub-pixels is an n-type transistor; and the setting unit is configured to: set the actual data voltage corresponding to the grey scale 0 of the green sub-pixels to be greater than the actual data voltage corresponding to the grey scale 0 of the red sub-pixels; and/or; set the actual data voltage corresponding to the grey scale 0 of the blue sub-pixels to be greater than the actual data voltage corresponding to the grey scale 0 of the red sub-pixels.

12. The module for optimizing image quality according to claim 10, further comprising a temperature detection unit; wherein the temperature detection unit is configured to detect, when temperatures of the display panel are in different temperature ranges, turn-on voltages of the sub-pixels having different colors to obtain maximum turn-on voltages of the sub-pixels having corresponding colors; and the setting unit is further configured to, when the luminance range of the display panel is within the predetermined luminance range or the luminance range of the display panel is the predetermined luminance range, in the gamma adjustment phase, set the actual data voltages according to the maximum turn-on voltages.

13. The module for optimizing image quality according to claim 10, wherein the drive transistor in the sub-pixels is the p-type transistor; and the module for optimizing image quality further comprises: an adjustment unit configured to, in a display phase, according to a maximum value among black image data voltages of the sub-pixels, control and adjust a voltage value of a general power supply voltage of an analogue circuit and a voltage value of a gate turn-off voltage, and control and adjust an absolute value of the voltage value of a gate turn-on voltage.

* * * * *